United States Patent
Whyte

(10) Patent No.: US 9,111,460 B2
(45) Date of Patent: Aug. 18, 2015

(54) PERI-MID

(76) Inventor: Judith Dawn Whyte, Burnaby (CA)

( * ) Notice: Subject to any disclaimer, the term of this patent is extended or adjusted under 35 U.S.C. 154(b) by 0 days.

(21) Appl. No.: 13/211,407

(22) Filed: Aug. 17, 2011

(65) Prior Publication Data

US 2012/0045741 A1    Feb. 23, 2012

Related U.S. Application Data

(60) Provisional application No. 61/374,419, filed on Aug. 17, 2010.

(51) Int. Cl.
  *G09B 19/00* (2006.01)
  *G09B 1/00* (2006.01)
  *G09B 5/00* (2006.01)

(52) U.S. Cl.
  CPC *G09B 19/00* (2013.01); *G09B 1/00* (2013.01); *G09B 5/00* (2013.01)

(58) Field of Classification Search
  USPC ........................................ 434/238; 340/573.1
  See application file for complete search history.

(56) References Cited

U.S. PATENT DOCUMENTS

| | | | |
|---|---|---|---|
| 4,112,926 A * | 9/1978 | Schulman et al. ............ 600/595 |
| 5,749,372 A * | 5/1998 | Allen et al. ................... 600/595 |
| 6,032,530 A * | 3/2000 | Hock ......................... 73/379.01 |
| 6,042,383 A * | 3/2000 | Herron ......................... 434/238 |
| 6,072,395 A * | 6/2000 | Vega ........................... 340/573.1 |
| 6,366,207 B1 * | 4/2002 | Murphy ......................... 340/576 |
| 6,582,380 B2 * | 6/2003 | Kazlausky et al. ........... 600/595 |
| 6,769,915 B2 * | 8/2004 | Murgia et al. ................ 434/236 |
| 7,383,728 B2 | 6/2008 | Noble et al. |
| 8,137,108 B2 * | 3/2012 | Hamway et al. .............. 434/236 |
| 2008/0206729 A1 | 8/2008 | Woolverton et al. |
| 2011/0053129 A1 * | 3/2011 | Basson et al. ................. 434/238 |
| 2011/0091848 A1 * | 4/2011 | Cooksy et al. ................ 434/238 |
| 2011/0183306 A1 * | 7/2011 | Krejcarek ..................... 434/238 |
| 2011/0199205 A1 * | 8/2011 | Kreml ...................... 340/539.11 |
| 2012/0161969 A1 * | 6/2012 | Husen et al. ................ 340/573.1 |

* cited by examiner

*Primary Examiner* — Sam Yao
*Assistant Examiner* — James Hull
(74) *Attorney, Agent, or Firm* — Buckingham, Doolittle & Burroughs, LLC

(57) ABSTRACT

An architecture is presented that provides a behavior monitoring and communication system. The system comprises behavior monitoring, cueing and communication devices designed to efficiently teach children and others self-monitoring skills with minimum adult intervention. The behavior monitoring, cueing and communication devices comprise at least one detection device that detects predefined behavior, such as positive or disruptive behaviors, and at least one monitoring device that monitors the predefined behavior. The system is programmed and overseen by the instructor or teacher from any location in the room through the use of the monitoring device. Further, the monitoring device can control and monitor more than one detection device simultaneously.

17 Claims, 5 Drawing Sheets

FIG. 5A
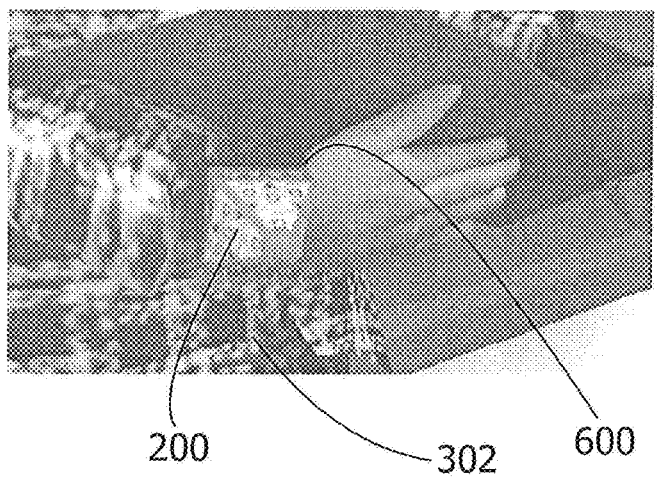
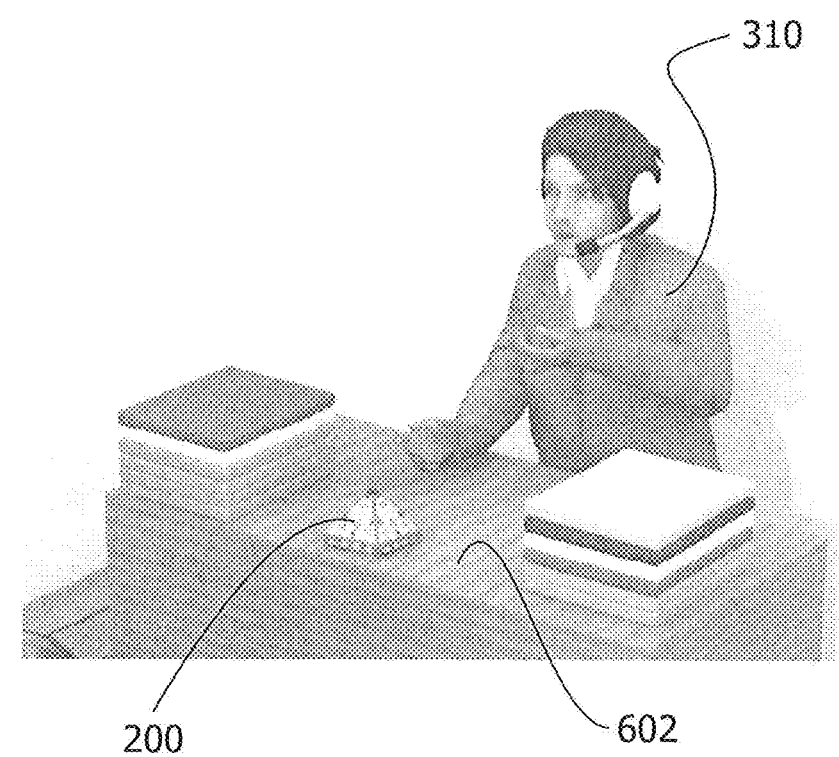
FIG. 5B

PERI-MID

CROSS-REFERENCE

This application claims priority from Provisional Patent Application Ser. No. 61/374,419 filed Aug. 17, 2010.

BACKGROUND

During typical periods of instructional time, many students have difficulty remaining attentive and many exhibit intrusive behavior toward others or refuse to participate. Additionally, many students demonstrate increased impulsive behaviors due to food allergies, un-diagnosed medical conditions, lack of blood sugar/energy, lack of sleep, increased/decreased physical output or medicinal side effects, etc. These behaviors are difficult to measure at home and, therefore, may go undiagnosed and untreated. Lack of resources necessary to correct these behaviors may ultimately have an adverse effect on students' progress. Students who experience damage to their progress may lose confidence, create consistent distractions in the classroom, and may negatively influence their peers. An effective solution is necessary.

Consequently, a need exists for a system that accurately pin points which behaviors are occurring and when the specific behavior(s) occurs most often. Pinpointing possible undesired behavior triggers is crucial when the instructor/teacher is attempting to determine reasonable behavior expectations for the student. The behavior monitoring and communication system of the present invention is designed to deter students from producing disruptive speech and/or movement. The system is overseen by the instructor/teacher and assists in pinpointing more accurate behavior expectations by automatic and manual tallying of baseline behavior occurrences. The system also provides continuous and immediate feedback to the student, teaching the student to recognize undesired behavior.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a behavior monitoring and communication system that comprises behavior monitoring, cueing and communication devices designed to efficiently teach children and others self-monitoring skills with minimum adult intervention. The behavior monitoring, cueing and communication devices comprise at least one detection device that detects predefined behavior, such as positive or disruptive behavior and at least one monitoring device that monitors the predefined behavior. The disruptive behavior is typically an impulsive movement and/or impulsive speech by a user.

Furthermore in the preferred embodiment of the present invention, the detection device is utilized by a student and the monitoring device is utilized by an instructor or teacher to monitor the student. The system is programmed and overseen by the instructor or teacher from any location in the room through the use of the monitoring device. Further, the monitoring device can control and monitor more than one detection device simultaneously.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIGS. 5A and B illustrate a perspective view of a user using the monitoring device in accordance with the disclosed architecture.

DETAILED DESCRIPTION

Figure 1:
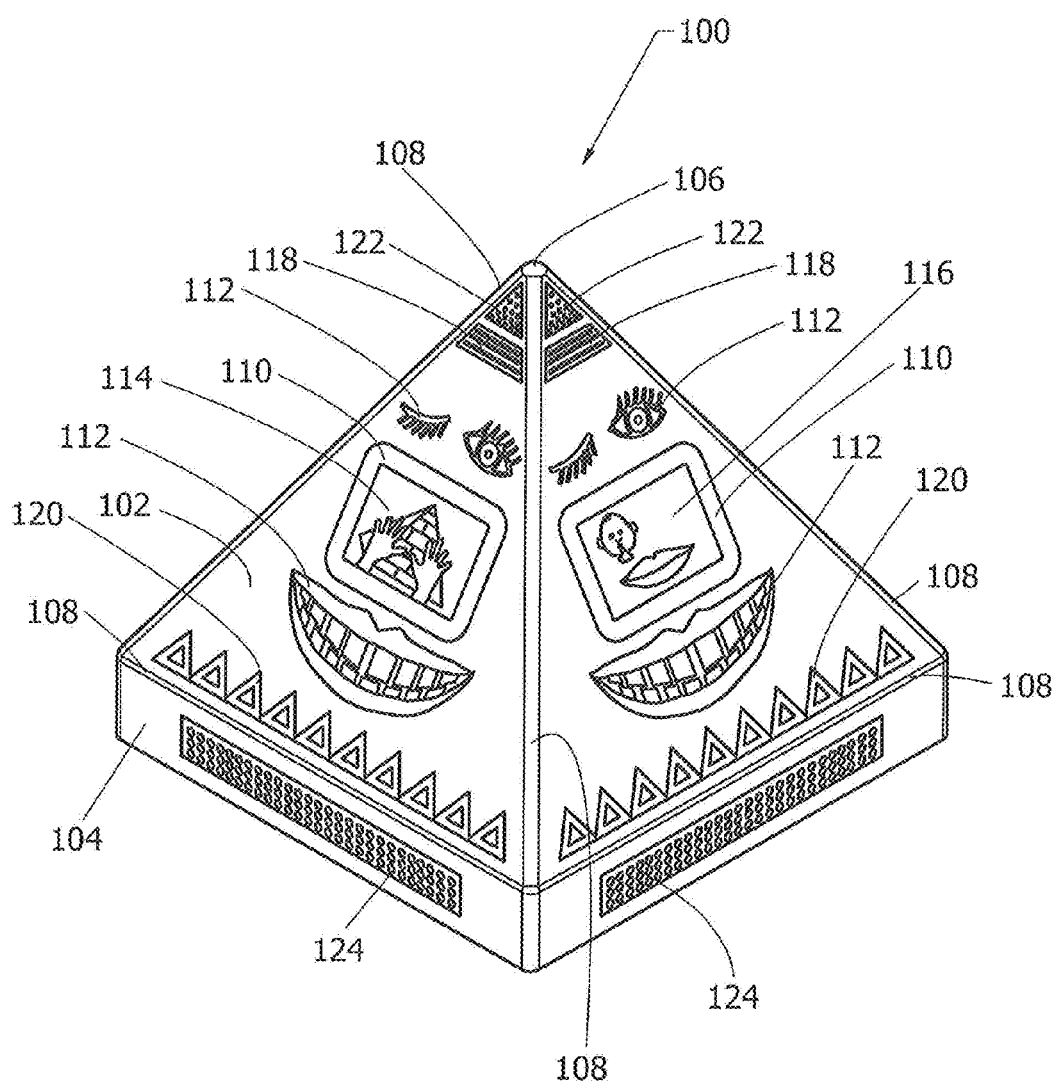
FIG. 1 illustrates a perspective view of a detection device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Pinpointing possible undesired behavior triggers is crucial when the instructor/teacher is attempting to determine reasonable behavior expectations for the student. The behavior monitoring and communication system of the present invention is designed to deter students from producing disruptive speech and/or movement. The system is overseen by the instructor/teacher and assists in pinpointing more accurate behavior expectations by automatic and manual tallying of baseline behavior occurrences. The system also provides continuous and immediate feedback to the student, teaching the student to recognize undesired behavior.

The behavior monitoring and communication system comprises behavior monitoring, cueing and communication devices designed to efficiently teach children and others self-monitoring skills with minimum adult intervention. The behavior monitoring, cueing and communication devices comprise at least one detection device that detects predefined behavior, such as positive or disruptive behaviors and at least one monitoring device that monitors the predefined behavior. The system is programmed and overseen by the instructor or teacher from any location in the room through the use of the monitoring device. The monitoring device can control and monitor more than one detection device simultaneously.

Referring initially to the drawings, FIG. 1 illustrates a detection device 100 that detects predefined behavior, such as positive or disruptive behaviors of a user. The detection device or Positive, Encouraging, Rewarding, Inclusive (PERI) 100 is a hand-held learning tool designed to extinguish undesired behaviors through immediate and continuous reward and feedback. The detection device 100 can be any suitable shape and size as is known in the art without affecting the overall concept of the invention. Typically, the detection device is sized to fit in a user's hand and is shaped as a pyramid. (See FIG. 1). The detection device 100 could be constructed of soft, durable plastic material, or any other suitable material. The device 100 would preferably stand approximately 6 to 7 inches high and be approximately 6 to 7 inches wide at the base, though other sizes could also be used without affecting the overall concept of the invention. Typically, the device 100 would be sized for primary-aged students to comfortably hold in both hands.

Further, the detection device 100 comprises panels 102, base 104 and a tip 106. The panels 102 and base 104 comprise touch sensitive grip surfaces 108 on the edges to allow for ease in handling the detection device 100. These edges are where the user would be instructed to grasp the detection device 100 in order to keep the device 100 in an attentive state. Furthermore, the sides or display panels 102 comprise signal frame lights 110 that display monitoring of disruptive behaviors. For example, one panel 102 would display monitoring of impulsive movement 114 and another panel 102 would display monitoring of impulsive speech 116. The remaining two behavior display panels 102 not occupied by impulsive movement 114 or impulsive speech 116 are available to be used as behavior cue panels (not shown). The behavior goals for these panels are chosen by the instructor or teacher from a behavior menu. Use of these two remaining panels is optional and the panels can be left blank if the instructor desires to work on speech and/or movement goals exclusively.

Typically, the two remaining panels are used to manually monitor other predefined behaviors un-related to movement or speech. They can also be used to cue classroom related behaviors, such as ask a question now, keep eyes on speaker, keep working, find a certain book, organize desk, collect pencils/erasers/scissors, write in agenda, take a break, gather homework, etc. The detection device 100 can also be placed on the student's desk to help to remind them to do any classroom related task during the school day, such as prepare for subject changes, gather classroom tools, prepare agendas, take appropriate washroom breaks, gather homework, clean desk, prepare for departure, etc. This feature allows the student to be discretely reminded to do things during busy or confusing periods during the day. The instructor sets the appropriate reminder picture into the signal frame lights 110 and either chooses to have the reminder programmed for a set time or to manually cue reminders by depressing the cue button (not shown).

Additionally, the detection device 100 also comprises facial features 112, such as eyes and a mouth, however other suitable facial features can be used without affecting the overall concept of the present invention. The eyes and mouth, along with a detectable heart pulse alert the user/student that the device 100 is in an attentive state or mode. Further, the display panels 102 comprises lights (not shown), typically green lights but any suitable color can be used, that flash or remain steady when the detection device 100 is in an attentive state. And, optional signal lights 118 can be positioned near the tip 106. These signal lights 118 also flash or remain steady when the device 100 is in an attentive state. The detection device 100 motivates the student to produce desired behaviors.

When the device 100 is presented to the student, the lights are off, the eyes are closed and the heart pulse is un-detectable. The student is then told that they must exhibit model attentive behavior (i.e., refrain from reaching out to distract/touch others and refrain from impulsive speech) to keep the device 100 in an attentive state. The student is then instructed to hold onto the detection device 100 with both hands and to refrain from speaking. Once these actions occur, the device 100 becomes active/attentive, the device's lights flash or remain steady, the eyes open, the mouth smiles and/or the heart pulse is detectable. If the student removes one hand from the detection device 100, the touch sensitivity feature is alerted, cueing the detection device 100 to recede to sleep mode (i.e., shuts down: lights off, pulse off, eyes closed), either automatically or gradually. If the student utilizes impulsive speech, this also cues the detection device 100 to recede to sleep mode.

Both speech 116 and movement 114 control panels of the detection device 100 are set to automatically shut down unless the detection device 100 is programmed for Opportunity Mode. Opportunity Mode allows the student a chosen number of behavior correction opportunities before the detection device 100 reverts to complete shut down. Each panel 102 displays opportunity signal lights 120 that indicate the occurrence countdown of behavior correction opportunities. The number of set correction opportunities should initially be a generous number to allow the student to be successful with comfortable effort. The opportunity number can then be lowered gradually so that the student's behavior goals can eventually be reached at a rate that will match the student's level of confidence and ability. The row of signal lights 120 will darken, one by one, following each opportunity that the student has spent. The signal lights 120 allow the student a visual tally of the correctional opportunities still available to him/her before the detection device 100 will revert to sleep mode. The signal lights 120 will flash simultaneously once the programmed number of correction opportunities has reached the final number, demonstrating a final warning to the student. Once opportunities have been used up, signal lights 118 near the tip 106 will illuminate indicating sleep mode. Then, the instructor has the option of either programming the detection device to reset for continued interplay or to remind the student to take a time-out from the detection device 100.

The display panels 102 cue desired behaviors and act as helpful reminders to the student. The entire corresponding display panel 102 will flash and emit a cue tone. These cues can be set to operate at a pre-selected time or may be manually executed by the teacher or facilitator. These cues alert the student to view the cue/desired behavior picture frame located on the flashing panel and to respond to that cue.

Additionally, if cueing the student to either vocalize or raise their hand to answer a question while movement and speech are in the process of being monitored, the instructor or teacher can depress the temporary, manual disable button on the corresponding behavior display panel of the monitoring device 200 to allow for momentary interruptions of movement and speech monitoring. The monitoring device 200 could also be programmed to execute a thirty second auto-pause to allow for temporary movement and/or speech. This cueing feature helps the student to understand that there are specific moments during instruction when it is appropriate to make vocal contributions or to raise a hand to do so. Thus, the detection device 100 teaches the student to anticipate these moments while adult interference is offered from a distance.

Furthermore, the tip 106 of the detection device 100 would be equipped with a voice detection microphone 122 that is capable of picking up the exclusive voice of the student using the detection device 100 and the base 104 is equipped with speakers 124 for receiving instructions from the instructor or teacher. Alternatively, the student could wear a clip microphone or necklace style microphone or a headset with a microphone to make voice pick-up more efficient. Any microphone as is known in the art can be used without affecting the overall concept of the invention. Furthermore, the microphone would distinguish the student's voice through standard voice recognition technology as is known in the art and/or the addition of a vibrations detector installed in the microphone that would pick up the vibrations of the student. As with impulsive movement, if the student exhibits impulsive speech the voice detection microphone picks up the sound of the student's voice and triggers the detection device 100 to immediately shut down. If an opportunity number has been set by the instructor, the detection device 100 will shut down more gradually according to the opportunity number programmed in, giving the student a selected number of opportunities within which to refrain from impulsive speech.

During shut-down, the detection device's lights will diminish completely, the eyes will shut and the heart-pulse will reduce to barely detectable, indicating that the device 100 is asleep or inattentive. The only item remaining will be the red behavior window frame on the corresponding display panel, indicating to the student which goal he/she needs to focus on (ie., either keeping silent or hands on the device, or both). The student receives no stimulation reward, unless they are demonstrating the desired behavior(s) expected of them. Once both hands have been returned firmly in place around the device 100 and/or the student stops speaking, the device's lights return to bright green, the heart-pulse increases to the maximum level and the eyes open wide. The detection device 100 can be programmed to work on decreasing impulsive movement, impulsive speech or both behaviors simultaneously.

Figure 2:
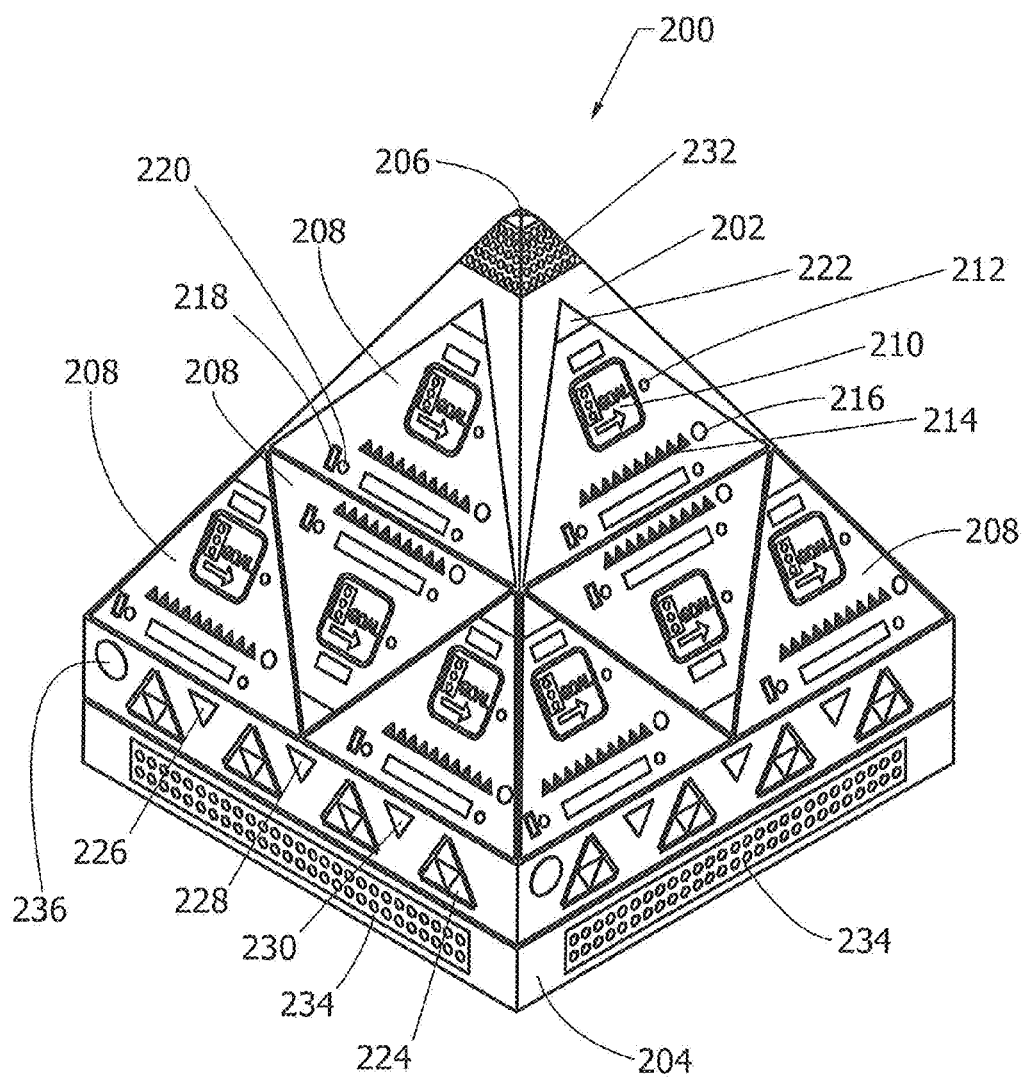
FIG. 2 illustrates a perspective view of a monitoring device in accordance with the disclosed architecture.

FIG. 2 illustrates a monitoring device 200 that monitors disruptive behavior. The monitoring device or Monitor, Intervene, Direct (MID) 200 would be made of similar material as the detection device (not shown), such as soft, durable plastic material, or other suitable materials. The monitoring device 200 would not have the added feature of touch sensitivity, but could if necessary. The monitoring device 200 could be of any suitable size and shape as is known in the art without affecting the overall concept of the invention. Typically, the monitoring device 200 is smaller than the detection device, being 4 to 6 inches wide at the base 204, and thus would be more conductive to portability. All alerts and behavior indicators would be mirrored on the instructor's monitoring device 200, allowing the instructor to be immediately aware of the interplay between the detection device and the student. The monitoring device 200 and the detection device communicate using communicative technologies well known in the art, such as radio frequency (RF) technology, wireless technology, Wi-Fi, Bluetooth® technology, etc. Any standard technology can be used that allows for two-way communication between the devices without affecting the overall concept of the invention. Furthermore, the monitoring device's capabilities can be programmed into a computer or other similar device and the monitoring/behavioral information for each detection device can be displayed on a smart board or active board or other similar device as is known in the art.

Furthermore, the monitoring device 200 comprises sides or panels 202, base 204 and a tip 206. The display sides or panels 202 displays up to four controls 208 for individual students. Typically, the student controls 208 are shaped as a triangle, but can be any suitable shape as is known in the art without affecting the overall concept of the invention. The first panel represents students 1, 2, 3 and 4 for impulsive speech monitoring, the second panel represents students 5, 6, 7, and 8 for impulsive speech monitoring, then the third panel represents students 5, 6, 7 and 8 for impulsive movement monitoring, and the fourth and last panel represents students 1, 2, 3 and 4 for impulsive movement monitoring. Further, a name window is provided at the base of each student's triangle on the panels 202 located underneath the row of opportunity lights. The teacher or instructor can program in each student's name or initials, which allows the teacher or instructor to quickly identify specific students visually. The control 208 for an individual student comprises a goal window 210 which displays the behavior goal(s) for that student, once a specific goal(s) is chosen for the student the monitoring device 200 sends automatic cues to the detection device when needed, or the instructor can manually cue the detection device via the manual cue button 212. Further, a red alert light 222 that can either remain steady or flash, alerts the instructor to the student's interactions with the detection device.

As stated above, if the student exhibits disruptive behavior the detection device recedes to sleep mode automatically unless the detection device is programmed for Opportunity Mode. Opportunity Mode allows the student a chosen number of behavior correction opportunities before the detection device reverts to complete shut down/sleep mode. Each control 208 displays opportunity signal lights 214 that indicate the occurrence countdown of behavior correction opportunities, and are typically numbered. Once the detection device enters sleep mode, the instructor can reset or revive the detection device by pressing the reset button 216. Or, the instructor can remind the student to take a time-out from the detection device.

An instructor can utilize various operating options 224 for each student, such as pressing a time-out flash button on the monitoring device 200 to enable the red lights 222 to quickly flash repeatedly when the correction opportunities have completely run out, or a time-out tone button to deliver an auditory time-out tone to indicate the time-out. Both the flash and tone options can be simultaneously programmed into the detection device through the monitoring device 200. Additionally, a constant vibrational feature and/or the addition of a lower volume tone alert can be an option for the student as well. The intensity of the flashing light can also be controlled through the monitoring device 200. All of these operating options 224 can be specifically controlled for each student being monitored. Or, the students as a group can be controlled via group buttons on the monitoring device 200. The group button include a group reset button 226 that resets the detection device of all students being monitored, a group pause button 228 that pauses the detection devices and a group cue button 230 that cues the detection devices as a group.

Furthermore, the instructor can choose to verbally remind the student to take a time-out from the detection device. The tip 206 is equipped with a microphone 232 through which the instructor can verbally communicate with the student at any time. Speakers 234 located at the base 204 of the device 200 are utilized with the microphone 232 to offer the instructor either one-way or two-way communication with the student at any time. And, a power button 236 is used to power the monitoring device 200 off and on.

Furthermore, the monitoring device 200 can automatically record the number of occurrences for predefined behaviors, such as disruptive behaviors (i.e., impulsive movement and/or impulsive speech). Baseline recording for other optional predefined behaviors would need to be manually recorded by the instructor via depressing the manual baseline record button 218 for each time that the undesired behavior occurs. The instructor does not need to utilize the baseline recording feature, and can utilize the monitoring device 200 without recording a baseline. However, the ability to store automatic or manually fed data accurately indicates specific behaviors that occur most frequently. This capability assists facilitators in zero-ing in on specific times during the day when certain behaviors may be increasing or decreasing. The number of times when an automatically recorded behavior occurs, will appear in a numeric window contained within the image of the detection device's two front teeth (See FIG. 1). The baseline number can be zero-ed out by depressing the zero out button 220 in order to reset the detection device before recording additional periods of baseline behavior.

Figure 3:
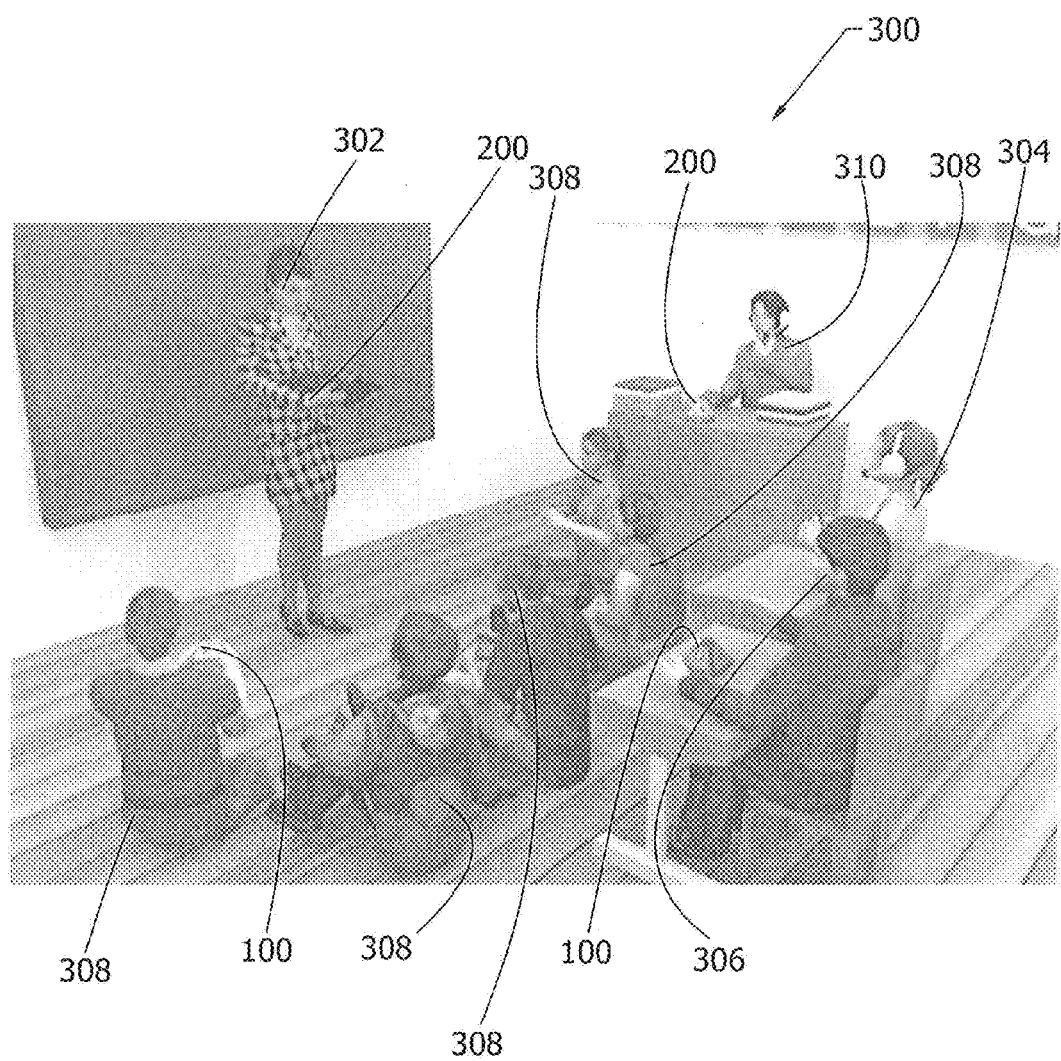
FIG. 3 illustrates a perspective view of the communication system in use in accordance with the disclosed architecture.

FIG. 3 illustrates the behavior monitoring and communication system 300 in use. The instructor or teacher 302 is utilizing the monitoring device 200 on her wrist and another teacher 310 has the monitoring device 200 resting on her desk, and the students 304, 306, 308 utilize the detection devices 100. One of the students 304 utilizes a headset to more efficiently communicate with the teacher 302 via the communication system 300. And, the student 306 is demonstrating impulsive touching which causes the detection device 100 to enter sleep mode.

Figure 4:
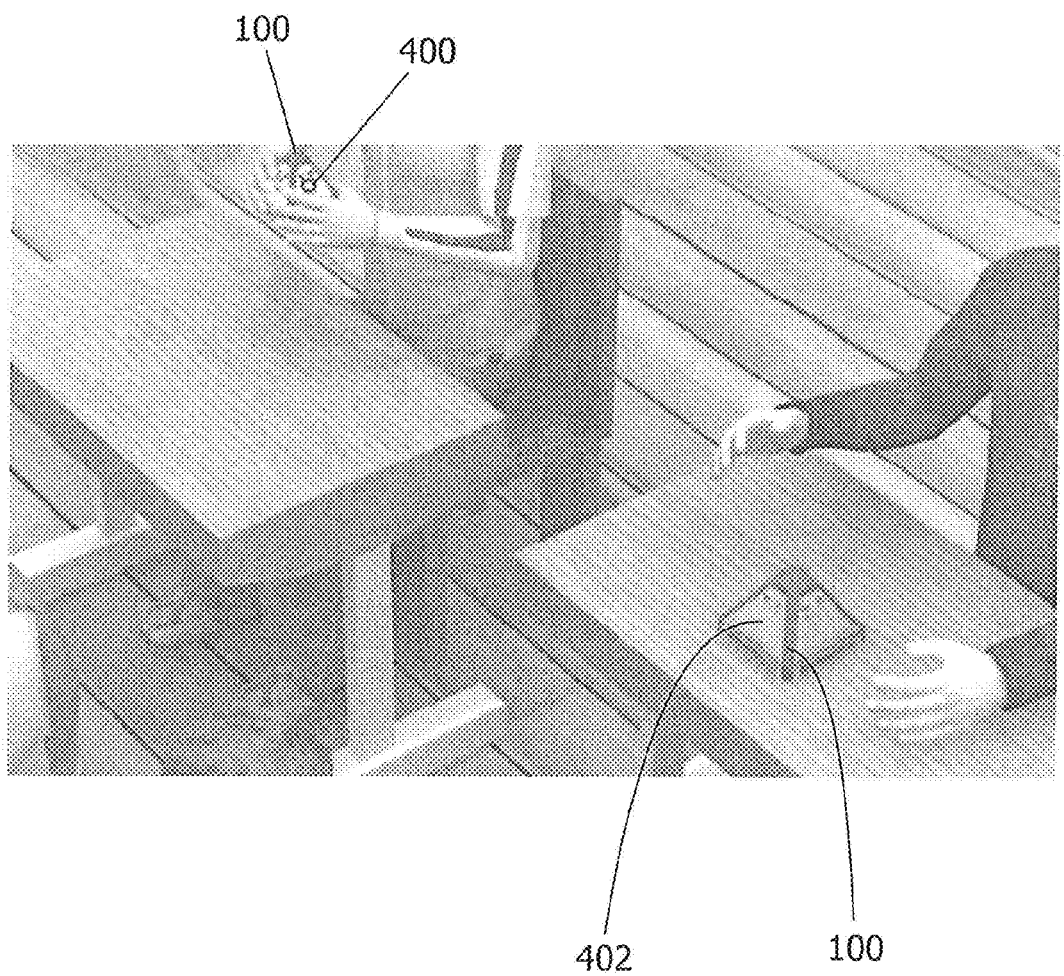
FIG. 4 illustrates a perspective view of the detection device in active mode and in sleep mode in accordance with the disclosed architecture.

FIG. 4 illustrates the detection device 100 in active mode 400 and in sleep mode 402. When the device 100 is presented to the student, the lights are off, the eyes are closed and the heart pulse is un-detectable (i.e., sleep mode). The student is then told that they must exhibit model attentive behavior (i.e., refrain from reaching out to distract/touch others and refrain from impulsive speech) to keep the device 100 in an attentive state. The student is then instructed to hold onto the detection device 100 with both hands and to refrain from speaking. Once these actions occur, the device 100 becomes active/attentive, the device's lights flash or remain steady, the eyes open, the mouth smiles and/or the heart pulse is detectable. If the student removes one hand from the detection device 100 or uses impulsive speech, the detection device 100 recedes to sleep mode (i.e., shuts down: lights off, pulse off, eyes closed).

FIG. 5A illustrates a teacher/instructor 302 using the portable monitoring device 200. The monitoring device 200 is compact enough that it can be transported on the teacher/instructor's wrist 600 or possibly clipped to a belt loop (not shown). FIG. 5B illustrates a teacher/instructor 310 utilizing the monitoring device 200, wherein the monitoring device 200 is left to rest on a desk 602. This gives the instructor/teacher 310 the ability to move more freely in the classroom and to monitor students from neighboring classrooms if necessary. The devices can communicate within any standard range as is known in the art, depending on the communicative technology that is employed.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A behavior monitoring and communication system, comprising:
   at least one detection device that detects impulsive movement and impulsive speech of a user comprising a plurality of panels, at least one touch sensitive grip surface attached to an edge of at least one of the plurality of panels, and at least one microphone embedded in the detection device; and
   wherein at least one of the panels illuminates to indicate an attentive state when the user refrains from impulsive movement and at least one of the panels illuminates to indicate the attentive state when the user refrains from impulsive speech; and
   wherein the at least one illuminated panel darkens to indicate a sleep mode when the user removes a hand from the least one touch sensitive grip surface or when the microphone detects speech from the user; and
   wherein the at least one detection device rewards the user when the user continues to refrain from impulsive movement and impulsive speech by remaining in the attentive state.

2. The system of claim 1, further comprising at least one monitoring device in wireless electronic communication with the at least one detection device that monitors the impulsive movement and the impulsive speech detected by the at least one detection device; and wherein the at least one monitoring device is capable of monitoring more than one detection device.

3. The system of claim 2, wherein each of the detection device and the monitoring device further comprise alerts and behavior indicators.

4. The system of claim 1, wherein the plurality of panels comprise a movement control panel for indicating impulsive movement and a speech control panel for indicating impulsive speech.

5. The system of claim 4, wherein when the detection device is attentive the detection device performs at least one of following functions: flashes lights, opens eyes, and produces a detectable heart pulse.

6. The system of claim 1, wherein if a user of the detection device exhibits a predefined behavior, the detection device automatically shuts-down.

7. The system of claim 1, wherein if a user of the detection device exhibits a predefined behavior, the detection device allows a specific number of behavior correction opportunities before shutting-down.

8. The system of claim 1, wherein the detection device emits cues signaling a user to perform desired actions.

9. The system of claim 2, wherein the monitoring device can be transported on a user's wrist or belt loop.

10. The system of claim 9, wherein the monitoring device is capable of recording occurrences of predefined behavior received from the detection device to create a baseline.

11. The system of claim 10, wherein the baseline is created manually.

12. The system of claim 10, wherein the baseline is created automatically.

13. A behavior modification and communication system, comprising:
   at least one detection device that detects impulsive movement and impulsive speech of a user comprising a plurality of panels, at least one touch sensitive grip surface attached to an edge of at least one of the plurality of panels, and at least one microphone embedded in the detection device; and
   wherein at least one of the panels displays a detectable electronic heart pulse to indicate an attentive state when the user refrains from impulsive movement and at least one of the panels displays the detectable electronic heart pulse to indicate the attentive state when the user refrains from impulsive speech rewarding the user instantaneously by remaining lit up; and wherein the at least one illuminated panel darkens to indicate a sleep mode when the user removes a hand from the least one touch sensitive grip surface or when the microphone detects speech from the user.

14. The system of claim 13, wherein the detection device emits cues signaling the user to perform desired actions.

15. The system of claim 14, further comprising at least one monitoring device in wireless electronic communication with the at least one detection device that monitors the impulsive movement and the impulsive speech detected by the at least one detection device; and wherein a user of the monitoring device disables at least one predefined behavior cue from the detection device.

16. The system of claim 15, wherein the detection device is used by a student and the monitoring device is used by a teacher to monitor the student.

17. The system of claim 13, wherein the plurality of panels comprise four panels configured in a pyramidal shape.

\* \* \* \* \*